United States Patent [19]
Brannon

[11] Patent Number: 5,854,622
[45] Date of Patent: Dec. 29, 1998

[54] JOYSTICK APPARATUS FOR MEASURING HANDLE MOVEMENT WITH SIX DEGREES OF FREEDOM

[76] Inventor: Daniel J. Brannon, P. O. Box 3443, San Luis Obispo, Calif. 93403

[21] Appl. No.: 784,495

[22] Filed: Jan. 17, 1997

[51] Int. Cl.[6] ............................. G09G 5/00; G09G 5/08
[52] U.S. Cl. ............................ 345/161; 345/156; 463/38
[58] Field of Search .......................... 345/161, 156–184; 74/471 XY; 463/36–38

[56] References Cited

U.S. PATENT DOCUMENTS

| | | |
|---|---|---|
| 4,216,467 | 8/1980 | Colston . |
| 4,349,708 | 9/1982 | Asher . |
| 4,375,631 | 3/1983 | Goldberg . |
| 4,448,083 | 5/1984 | Hayashi . |
| 4,641,123 | 2/1987 | Whitehead . |
| 4,962,448 | 10/1990 | DeMaio et al. . |
| 5,543,592 | 8/1996 | Gaultier et al. ................. 74/471 XY |
| 5,589,828 | 12/1996 | Armstrong ........................ 345/161 |
| 5,619,195 | 4/1997 | Allen et al. ..................... 74/471 XY |

*Primary Examiner*—Steven J. Saras
*Assistant Examiner*—David L. Lewis

[57] ABSTRACT

Described and shown is a joystick for measuring movement of, or force and torque against, a manually operated handle in six degrees of freedom. The degrees of freedom include translational motion or force along each of three orthogonal axes and rotational motion or torque about each of the axes. Also described and shown is a circuit for interfacing the joystick to a standard computer port.

5 Claims, 7 Drawing Sheets

5,854,622

JOYSTICK APPARATUS FOR MEASURING HANDLE MOVEMENT WITH SIX DEGREES OF FREEDOM

BACKGROUND—FIELD OF INVENTION

This invention relates to manually operated controllers, specifically to an improved version of a joystick.

BACKGROUND—DESCRIPTION OF PRIOR ART

Joysticks are conventionally utilized to provide positioning information in a two dimensional system. For example, joysticks are commonly used to position objects on the screen of a video game or to manipulate a machining tool about a two dimensional work surface.

The typical joystick, such as that shown in U.S. Pat. No. 4,375,631, issued on Mar. 1, 1983 to Thomas R. Goldberg, consists of two potentiometers coupled to a control handle. As the handle is pivoted about two orthogonal axes, the resistance of the potentiometers varies in relation to the position of the handle. The value of resistance or the magnitude of the current passing through the potentiometer indicates the position of the joystick handle about the corresponding axis. This resistance, or current, representing the handle's position is then utilized to control some other function such as the position of the video game object or the machine tool head. The movement of the handle may be used to dynamically control the object by continuously monitoring the change in the potentiometer resistance and employing the monitored resistance to move the object in a pattern corresponding to the movement of the joystick handle. The conventional joystick has enjoyed great commercial success as a gaming device. Many personal computers have an interface port designed to connect to conventional joysticks. Numerous software applications, especially games, support conventional joysticks as a method of interacting with the application.

In some applications the object to be controlled by the joystick may need to be positioned or moved in a three dimensional space or rotated about any of three orthogonal axes. In such a case, the conventional joystick which is limited to controlling movement in only two dimensions is inadequate.

The hand controller shown in U.S. Pat. No. 4,216,467, issued on Aug. 5, 1980 to John R. Colston demonstrates a device capable of measuring force applied to a hand grip in six degrees of freedom. The hand controller consists of six linear force sensors connected between the base and the handle so as to support the handle and measure any force applied against it. The linear force sensors used in the hand controller are not typical and thus must be custom-manufactured. Also, the hand controller requires a relatively complex coordinate transformation mechanism to convert the sensor measurements to useable directional values. The joystick control shown in U.S. Pat. No. 4,641,123, issued on Feb. 3, 1987 to James M. M. Whitehead is similar to the hand controller, but uses linear piston-type potentiometers instead of linear force sensors, and thus measures position of the handle instead of force against it. The joystick control suffers from the same drawbacks as the hand controller. Namely, it too requires custom-made sensors and a relatively complex coordinate transformation mechanism.

OBJECTS AND ADVANTAGES

Accordingly, several objects and advantages of the present invention are use of commonly available sensors, ability to measure motion in six degrees of freedom, simple conversion of sensor measurements to useable directional values and, in at least one embodiment, compatibility with existing interfaces based on the conventional joystick.

SUMMARY OF THE INVENTION

The present invention provides a joystick for measuring movement of a manually operated handle in six degrees of freedom. The degrees of freedom include translational motion along each of three orthogonal axes and rotational motion about each of the axes. The joystick is comprised of a base, a handle, at least three dual-axis sensors attached to the base and a coupling between each sensor and the handle so that motion of the handle is transferred to the sensors for detection and measurement.

The novel features which are characteristic of the invention, as to organization and method of operation, together with further objects and advantages thereof will be better understood from the following description considered in connection with the accompanying drawings which a preferred embodiment of the invention is illustrated by way of an example. It is to be expressly understood, however, that the drawings are for the purpose of illustration and description only and are not intended as a definition of the limits of the invention.

DESCRIPTION—FIGS 1 to 4

Figure 1:
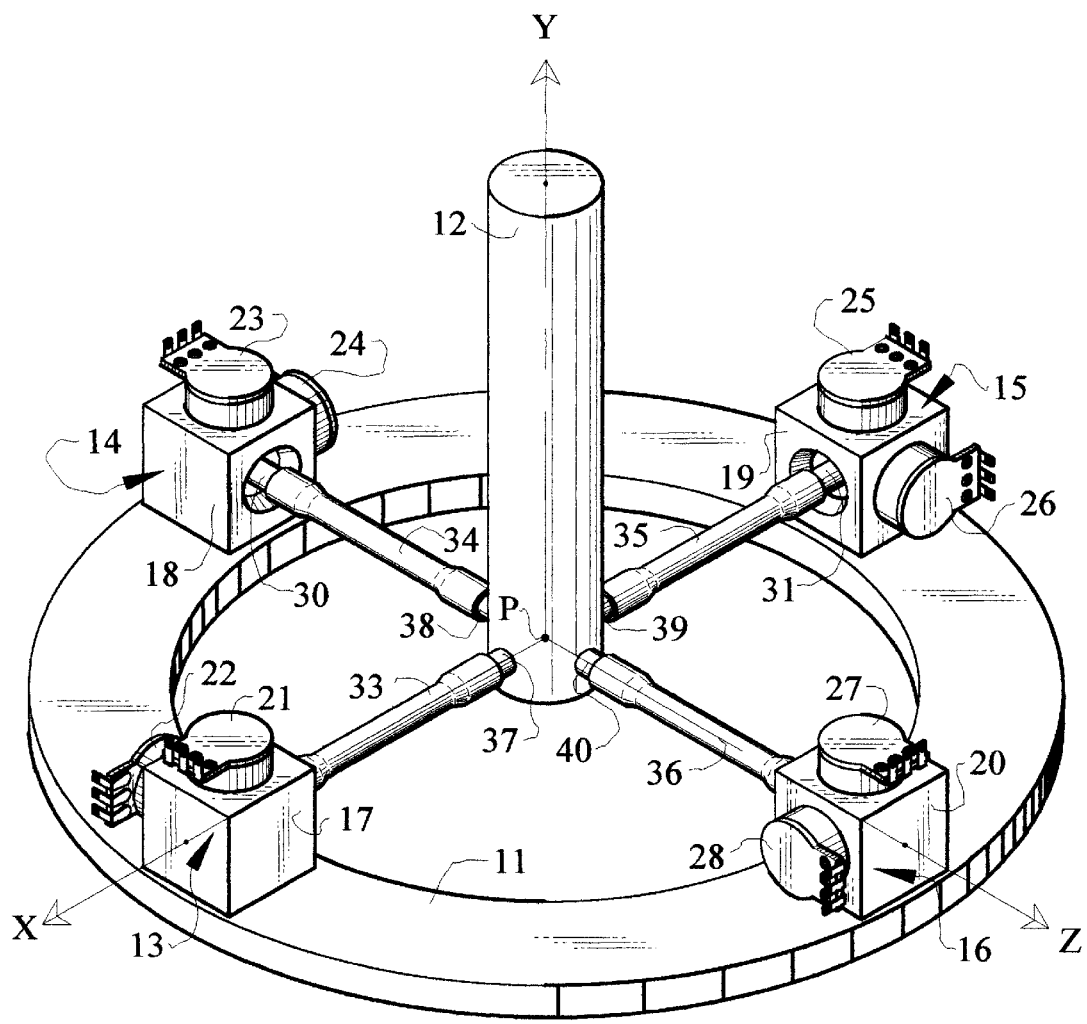
FIG. 1 is an isometric view of one embodiment of a joystick according to the present invention.

The joystick device of the present invention is one capable of responding to manual force inputs applied to control handle 12 in each and all of three mutually perpendicular linear directions relative to any one of three mutually perpendicular axes X, Y, Z as well as each and every one of three respective rotary directions about such axes. Whereas handle 12 has been shown in the drawings as extending vertically it should be understood that the device may be so oriented that handle 12 will extend in any other direction that the operator may find to be convenient.

According to the invention, handle 12 is coupled to at least three dual-axis sensors 13–16 which are securely attached to a base 11. Dual-axis sensors 13–16 may be any device or assembly capable of measuring a physical quantity such as force, torque, position, velocity or acceleration along or about two orthogonal axes.

The materials and construction used in the means for coupling dual-axis sensors 13–16 to handle 12 is largely determined by the type of dual-axis sensors 13–16 used in the embodiment. When force or torque sensors are used, the means for coupling must provide a rigid connection between handle 12 and dual-axis sensors 13–16, whereby the force or torque applied to handle 12 will be transmitted directly to the dual-axis sensors 13–16 for measurement. When position, velocity or acceleration sensors are used, the means for coupling must provide a moveable connection between handle 12 and dual-axis sensors 13–16, whereby the position, velocity or acceleration of handle 12 will be reflected to dual-axis sensors 13–16 for measurement.

The conversion of the measurements from each dual-axis sensor 13–16 to net translational and rotational quantities is relatively straightforward. Each dual-axis sensor 13–16 measures a physical quantity along or about two orthogonal axes centered at a known point with respect to base 11. Using this information, the two independent measurements from each dual-axis sensor 13–16 can be combined into a three-dimensional vector of the same physical quantity. The sum of the vectors from all dual-axis sensors 13–16 determines the net translational quantity exerted upon handle 12, while the sum of the moments of the vectors with respect to pivot point P determines the net rotational quantity exerted upon handle 12.

Figure 2:
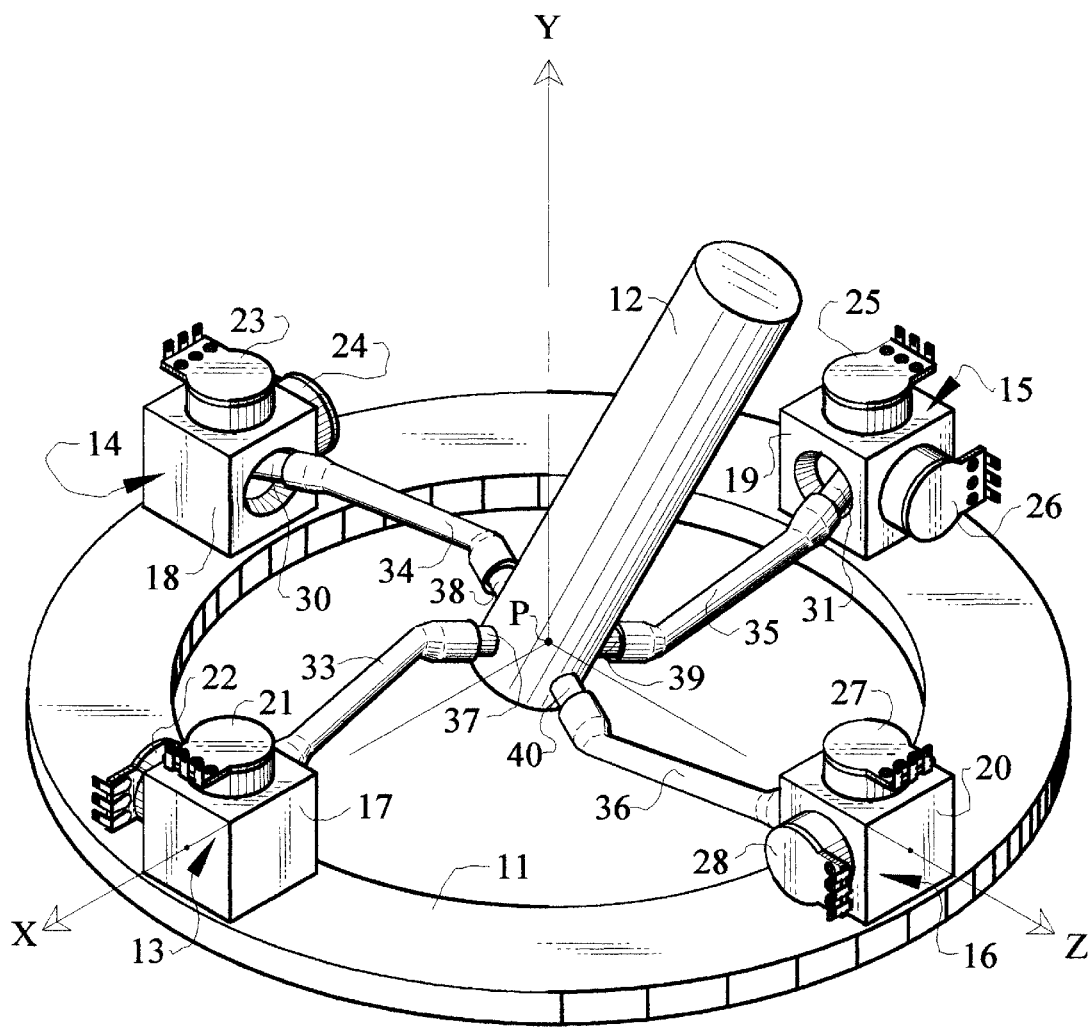
FIG. 2 is an isometric action view of the embodiment in FIG. 1.

The preferred embodiment of the invention is shown in FIG. 1 with handle 12 in the center position, and in FIG. 2 with handle 12 displaced rotationally about the pivot point P. Please note that pivot point P denotes a location on handle 12 and as such will be displaced from the intersection of the X, Y, and Z axes when translational force is applied to handle 12. Assuming that the positive X axis extends rightward, the positive Y axis extends upward, and the positive Z axis extends forward, the rotational displacement shown in FIG. 2 is interpreted as a combination of the rotations yawright, pitch-down and roll-left. Four dual-axis sensors 13–16 are used in the preferred embodiment of the invention. Each dual-axis sensor 13–16 consists of two potentiometers 21–28 coupled to a control handle 29–32. As control handle 29–32 is pivoted about two orthogonal axes, the resistance of potentiometers 21–28 varies in relation to the position of control handle 29–32. This type of sensor is equivalent to the conventional joystick, such as that shown in U.S. Pat. No. 4,385,631, issued on Mar. 1, 1983 to Thomas R. Goldberg. The dual-axis sensors 13–16 are arranged about a circle with control handle 29–32 of each dual-axis sensor 13–16 extending toward the center of the circle. Handle 12 is positioned in the center of the circle with pivot point P in the same plane as control handles 29–32. The dual-axis sensors 13–16 are coupled to handle 12 with four elastic tubes 33–36 and four extension rods 37–40. The extension rods 37–40 are attached at one end of handle 12 with each rod 37–40 extending part-way along a line between pivot point P and the end of a centered control handle 29–32. Each elastic tube 33–36 connects the control handle 29–32 of a dual-axis sensor 13–16 to a rod 37–40. Each connection is made by stretching one end of an elastic tube 33–36 over a control handle 29–32 and stretching the other end over a rod 37–40. Once all connections have been made, each elastic tube 33–36 should be under sufficient tension to support handle 12 and return it to the center position when released from manual constraint.

Figure 4:
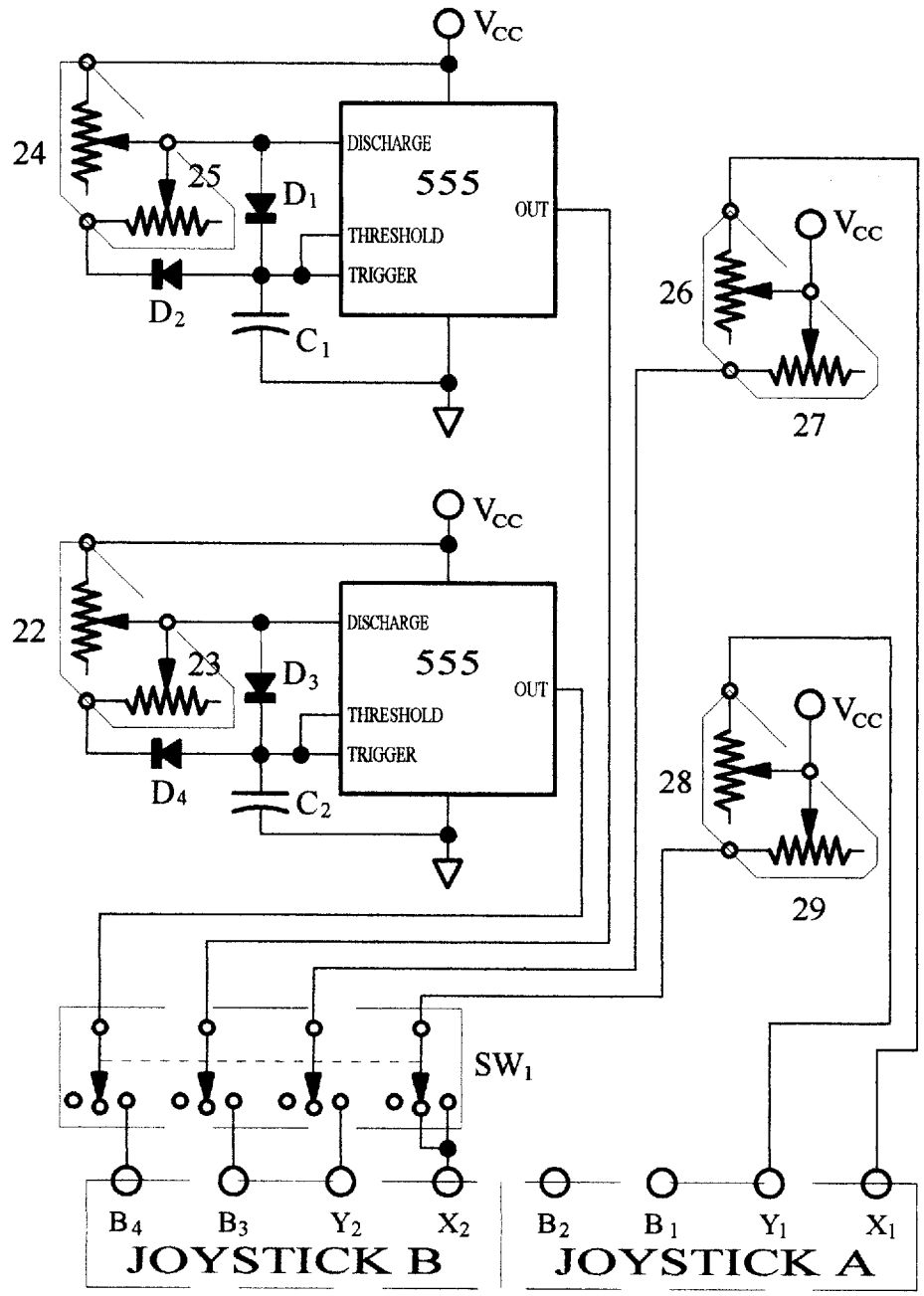
FIG. 4 is schematic diagram of the interfacing between the joystick and a standard computer game port.

The preferred embodiment of the invention can be connected to the gameport of a personal computer, as shown in FIG. 4., so as to mimic the operation of a conventional joystick. The standard gameport interface is designed to connect up to two conventional joysticks with up to two buttons each. The gameport interface has four digital inputs $B_1$–$B_4$, one for each button input, and four analog inputs $X_1, Y_1, X_2, Y_2$ intended to be connected directly to the potentiometers on conventional joysticks. The analog inputs use the potentiometers to vary the width of a digital pulse in proportion to the resistive value of the potentiometer. The pulse width is measured by software and used to determine the position of the control handle with respect to its centered position.

Since dual-axis sensors 13–16 used in the preferred embodiment are conventional joysticks, up to two dual-axis sensors 15,16 may be connected directly to the four analog inputs $X_1, Y_1, X_2, Y_2$ of the gameport without need for additional conversion circuitry. The vertical position potentiometer 26 of dual-axis sensor 15 is connected to analog input $X_1$, while the vertical position potentiometer 28 of dual-axis sensor 16 is connected to analog input $Y_1$. The horizontal position potentiometer 25 of dual-axis sensor 15 is connected to analog input $Y_2$, while the horizontal position potentiometer 27 of dual-axis sensor 16 is connected to analog input $X_2$. The other two dual-axis sensors 13,14, are connected via conversion circuits to button inputs $B_3$, $B_4$ on the gameport interface. This leaves two button inputs $B_1$, $B_2$ available to connect up to two joystick buttons, if desired.

The output of each conversion circuit is a digital signal. The output signal is high for a length of time determined solely by the value of one potentiometer input 22,24, while the output signal is low for a length of time determined solely by the value of the other potentiometer input 21,23. Software is used to measure the high and low pulse widths to determine the position of control handle 29,30 with respect to its centered position.

Each conversion circuit is comprised of one standard LM555 monolithic timer or equivalent $IC_1, IC_2$, one 0.01 $\mu F$ capacitor $C_1$, $C_2$, and two diodes $D_1$–$D_4$. The LM555 $IC_1$, $IC_2$ timer works by setting the DISCHARGE input to a high impedance input and setting the OUT output high when the TRIGGER input voltage falls below ⅓ of the supply voltage $V_{cc}$ and by setting DISCHARGE to a low impedance path to ground and setting OUT low when the THRESHOLD input voltage rises above ⅔ of the supply voltage $V_{cc}$. The conversion circuit is connected such that both THRESHOLD and TRIGGER monitor the voltage $V_A, V_B$ across capacitor $C_1, C_2$. When DISCHARGE is a high impedance input, current flows from the supply voltage $V_{cc}$, through vertical position potentiometer 22,24 of dual-axis sensor 13,14 and into capacitor $C_1, C_2$, thus increasing voltage $V_A, V_B$. When voltage $V_A$, $V_B$, exceeds ⅔ of supply voltage $V_{cc}$, DISCHARGE changes to a low impedance path to ground and OUT transitions to low. Current flowing through vertical potentiometer 22,24 now flows into DISCHARGE instead of capacitor $C_1$, $C_2$. The diodes $D_1$–$D_4$ direct the current flowing from capacitor $C_1, C_2$ to pass through horizontal position potentiometer 21,23 of dual-axis sensor 13,14 before entering DISCHARGE. When voltage $V_A, V_B$ falls below ⅓ of supply voltage $V_{cc}$, DISCHARGE changes back to a high impedance path, OUT transitions to high and the charge-discharge cycle repeats.

The four-pole-triple-throw switch $SW_1$ is used to selectively eliminate certain inputs from connecting to the gameport interface. In the first position of switch $SW_1$, all inputs are connected to the gameport interface. Thus, all six degrees of freedom of motion are available as input. In the second position of switch $SW_1$, the two inputs from the conversion circuits as well as the input from the horizontal position potentiometer 25 of dual-axis sensor 15 are eliminated from the gameport interface connection. The second position of switch $SW_1$, thus provides only three degrees of freedom of motion as input, including yaw, pitch, and roll. In the third position of switch $SW_1$, the input from the horizontal position potentiometer 27 of dual-axis sensor 16 is additionally eliminated from the gameport interface connection. The third position of switch $SW_1$ provides only two degrees of freedom of motion as input, namely pitch and roll. With switch $SW_1$, in the third position, the preferred embodiment of the invention imitates a conventional joystick.

Operation—FIGS. 1 and 2

When the invention is assembled, handle 12 is suspended solely by the couplings to dual-axis sensors 13–16. The invention supports yaw, pitch and roll rotations as well as vertical, lateral and longitudinal translations of handle 12.

To operate the preferred embodiment of the invention, a user firmly grasps handle 12, moving and rotating handle 12 in the desired direction of motion. Handle 12 will change its spatial orientation in relation to the magnitude and direction of the force and torque applied. The change in position is reflected through the elastic tubes 33–36 to the dual-axis sensors 13–16. The measured values from each dual-axis sensor 13–16 and knowledge of the construction and dimensions of the invention is sufficient to determine the relative magnitude and direction of the force and torque exerted upon handle 12.

Figure 5:
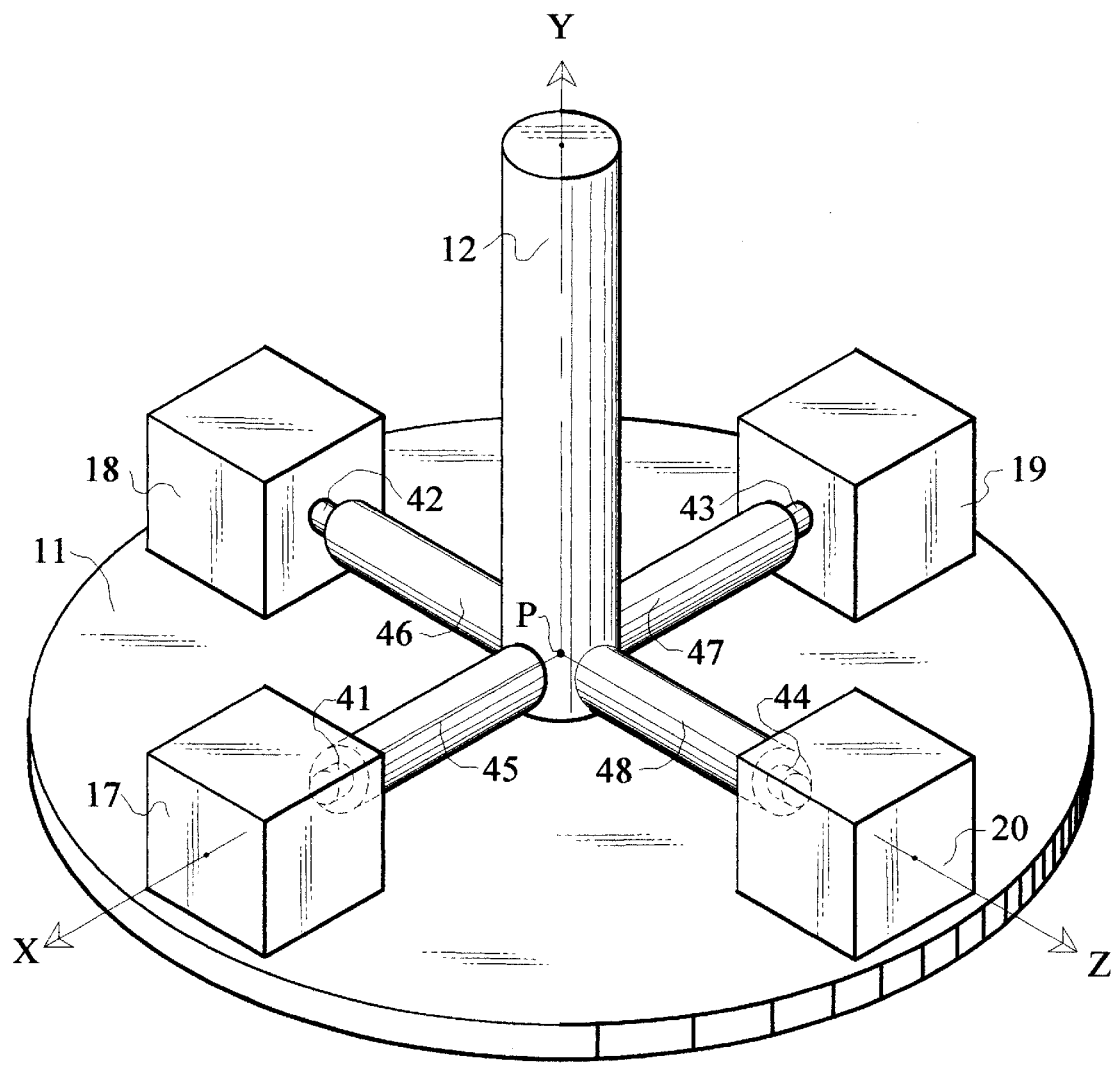
FIG. 5 is an isometric view of another embodiment of a joystick according to the present invention.
Figure 6:
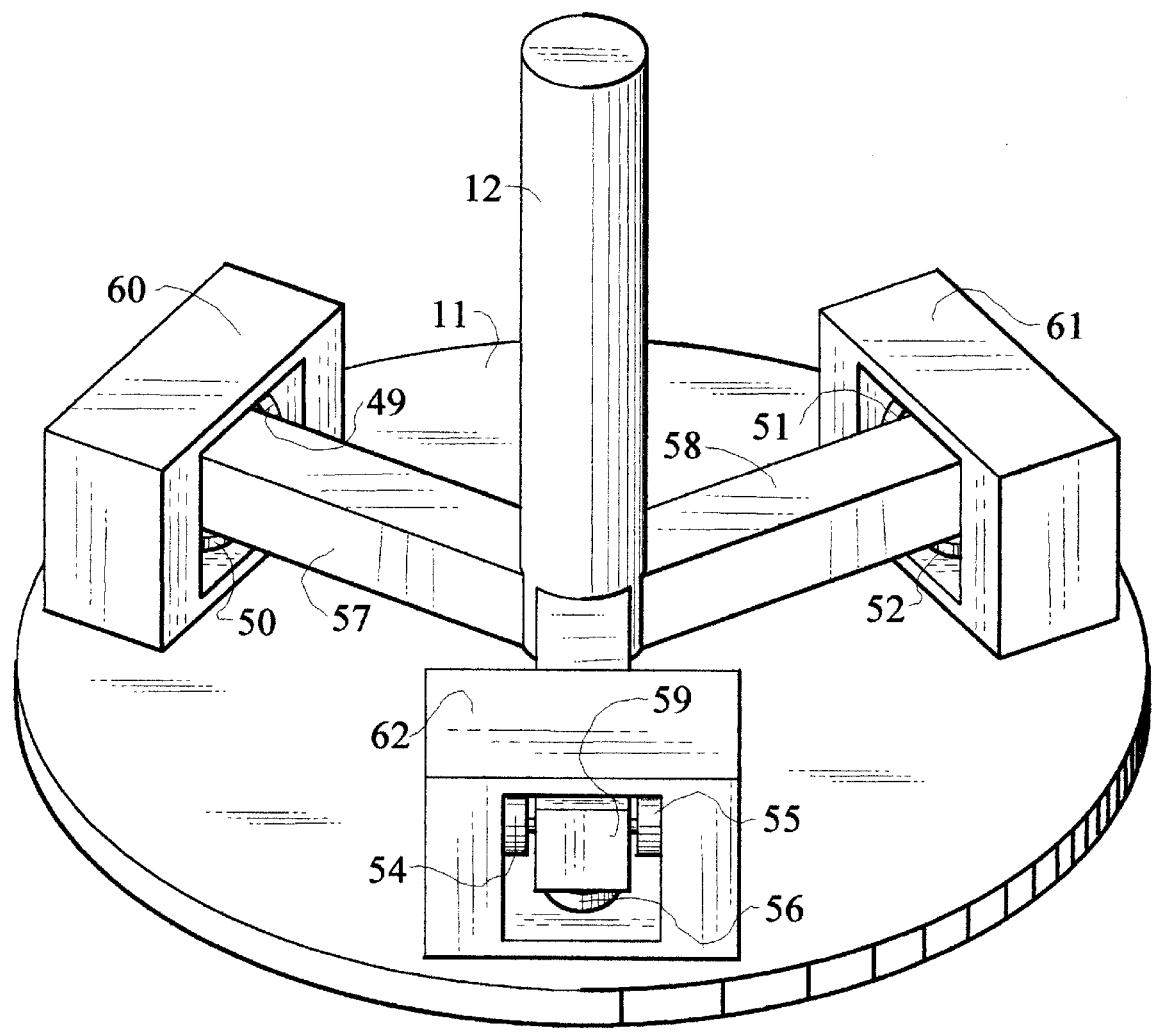
FIG. 6 is an isometric view of another embodiment of a joystick according to the present invention.
Figure 7:
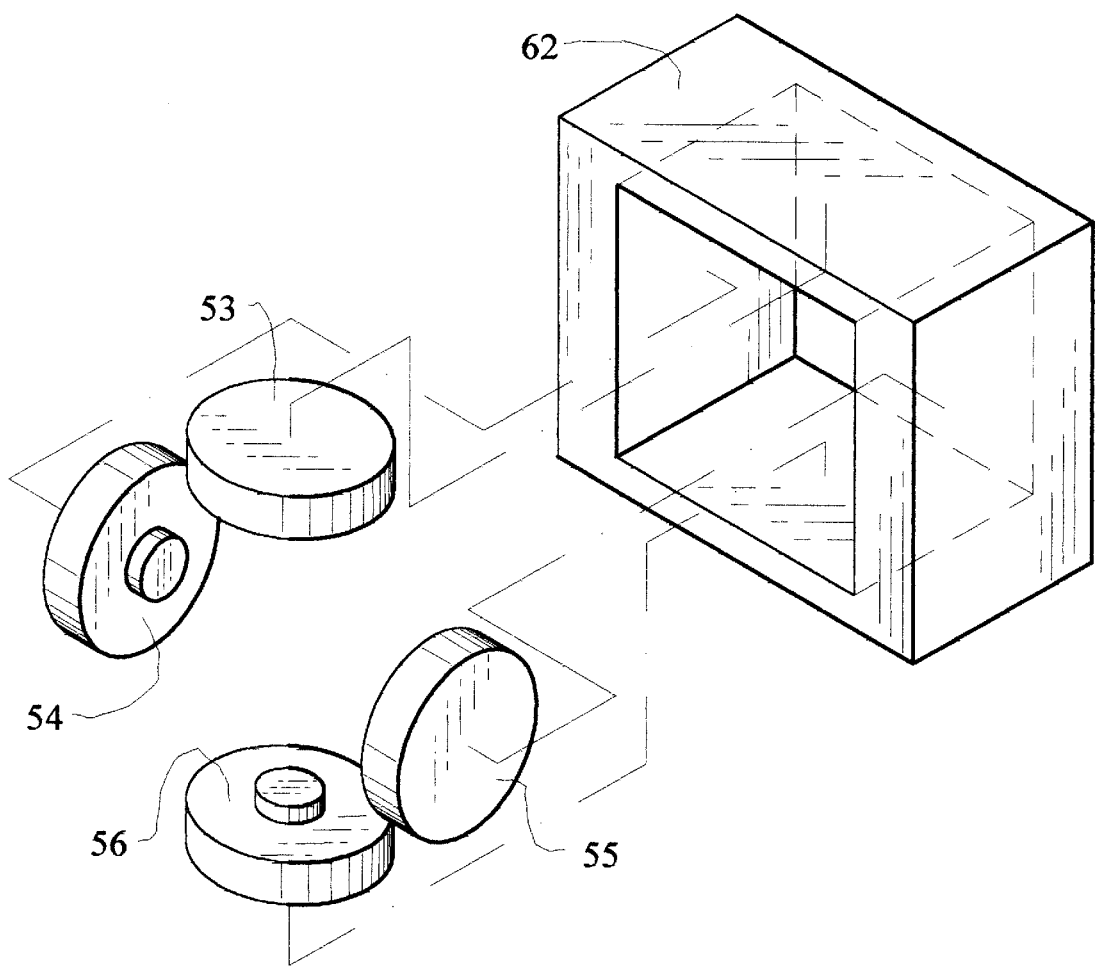
FIG. 7 is an exploded isometric view of another embodiment of a dual-axis sensor.

Description—FIGS. 5 to 7

In another embodiment of the invention, as shown in FIG. 2, four dual-axis sensors 13–16 are used. Each dual-axis sensor 13–16 consists of a dual-axis force stick 41–44 and a sensor case 17–20. This type of sensor is equivalent to the keyboard-embedded mini-joysticks used in many portable computers. Force sticks 41–44 use strain gages to measure the force applied orthogonal to the axis of the force sticks 41–44. The dual-axis sensors 13–16 are arranged about a circle with force stick 41–44 of each dual-axis sensor 13–16 oriented toward the center of the circle. The handle is positioned in the center of the circle with pivot point P in the same plane as force sticks 41–44. The means for coupling dual-axis sensors 13–16 to handle 12 consists of four extension tubes 45–48. The extension tubes 45–48 are attached at one end of the handle 12 with each extension tube 45–48 extending along a line between pivot point P and a force stick 41–44. The end of each extension tube 45–48 is fitted over a force stick 41–44 so that force applied to handle 12 will be transmitted through extension tubes 45–48 to force sticks 41–44 for measurement.

Figure 3:
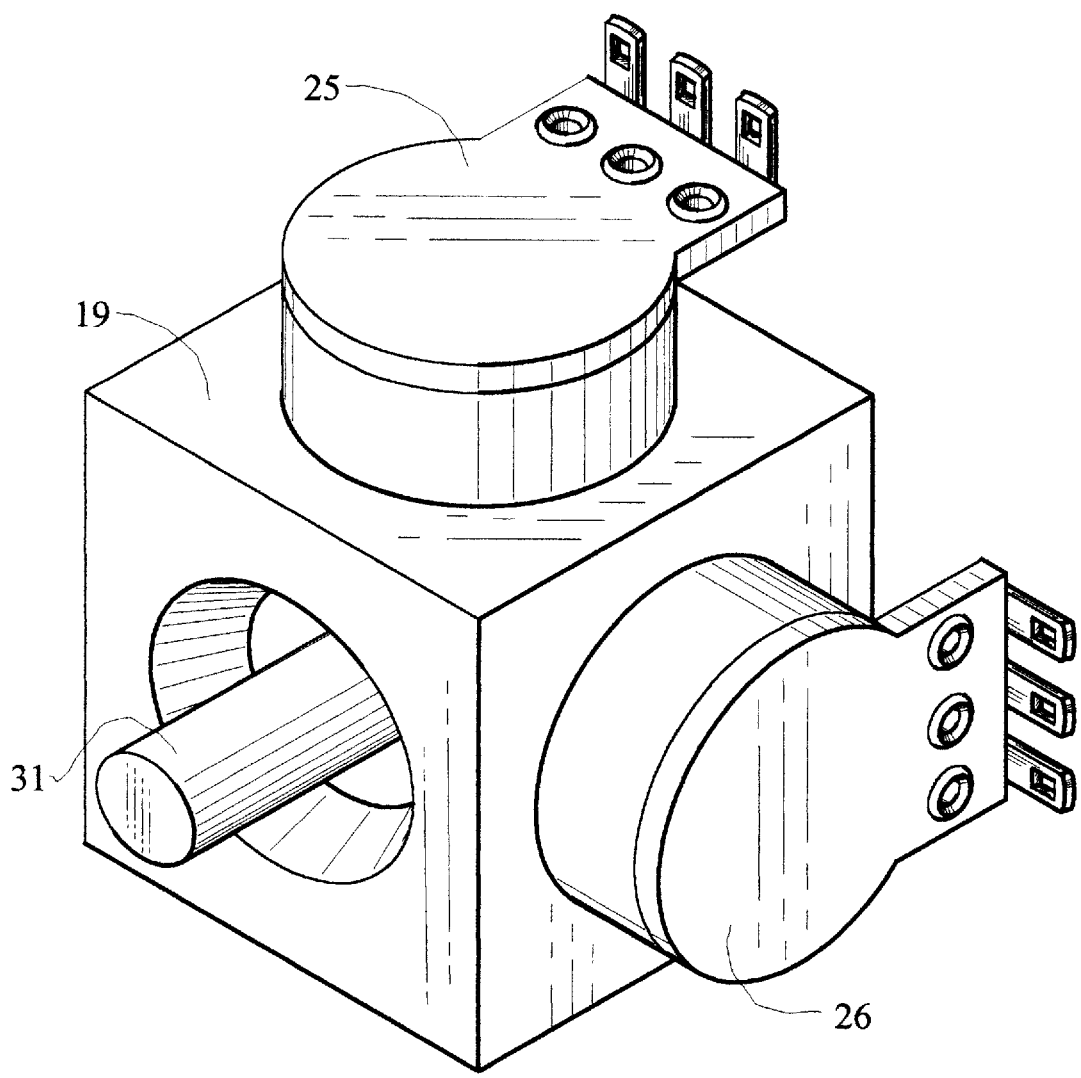
FIG. 3 is an isometric view of a conventional joystick.

In another embodiment of the invention, as shown in FIG. 3, three dual-axis sensors 13–16 are used. Each dual-axis sensor 13–16 consists of four load cells 49–56 mounted on the four inner surfaces of a square mounting bracket 60–62, as shown in FIG. 6. The dual-axis sensors 13–16 are arranged about a circle with handle 12 at the center of the circle. The means for coupling dual-axis sensors 13–16 to handle 12 consists of three extension beams 57–59 with square cross-sections. Beams 57–59 are attached at one end of handle 12 with each beam 57–59 extending through the center of a mounting bracket 60–62 and with each side of beam 57–59 contacting a load cell 49–56. Thus force and torque applied to handle 12 will be transmitted through beams 57–59 to load cells 49–56 for measurement.

Operation—FIGS. 5, 6

To operate the embodiments of the present invention shown in FIG. 5 and FIG. 6, a user firmly grasps handle 12, attempting to move and rotate handle 12 in the desired direction of motion. Handle 12 will not move since it is rigidly coupled to the dual-axis sensors 13–16. Instead, the force and torque exerted upon handle 12 will be transferred directly to the dual-axis sensors for measurement. The measured values from each dual-axis sensor 13–16 and knowledge of the construction and dimensions of the invention is sufficient to determine the relative magnitude and direction of the force and torque exerted upon handle 12.

CONCLUSION, RAMIFICATIONS AND SCOPE

Other arrangements of dual-axis sensors and methods of coupling the dual-axis sensors to the handle can be used to carry out teaching of the present invention. When elastic coupling between the handle and sensors is used, the sensors must be positioned such that all tensional forces of the elastic tubes cancel each other when the handle is at the desired center position. Additionally, as the base serves the primary purpose of fixing the dual-axis sensors in position relative to each other, the base may take on any form suitable to accomplishing such task. In some situations, it may be of advantage for the user to operate the base while the handle remains fixed in position. For example, if the handle of the preferred embodiment of the present invention, as shown in FIG. 1, was rigidly fixed in position, the base could be used as a six degree-of-freedom steering-wheel or flight-yoke. In some uses it is of advantage to have momentary contact buttons to provide additional means of input. Such buttons may be mounted upon the handle, the base or both. It may also be of advantage for the handle to have a comfortable, ergonomic shape for gripping with a hand.

I claim:

1. A joystick allowing six degrees of freedom of hand input force for conversion of the hand input force into electrical output signals, said joystick comprising:

a) a handle;

b) abase;

c) at least three dual-axis sensors attached to said base; and d) means for coupling said sensors to said handle so as to support said handle and to transmit said hand input force to said sensors whereby said hand input force varies the quantities measured by the sensors in relation to the direction and magnitude of the hand input force.

2. A joystick in accordance with claim 1 wherein said means for coupling provide an elastic coupling between said sensors and said handle so that movement of the handle is restricted to a limited range, the sensors being responsive to angular position quantities so that said movement varies said angular position quantities measured by the sensors in relation to the direction and magnitude of movement.

3. A joystick in accordance with claim 1 wherein said means for coupling provide a rigid connection between said sensors and said handle so that movement of the handle is significantly limited, the sensor being responsive to force quantities so that said movement varies said force quantities measured by the sensors in relation to the direction and magnitude of the movement.

4. A joystick allowing six degrees of freedom of hand input force for conversion of the hand input force into electrical output signals, said joystick comprising:

a) a handle;

b) a base;

c) at least three dual-axis angular position sensors attached to said base; and d) means for elastically coupling said sensors to said handle so as to support the handle and to transmit said hand input force to the sensors, the hand input force causing movement of said handle, said movement being restricted to a limited range, whereby said movement varies the angular position quantities measured by the sensors in relation to the direction and magnitude of the movement.

5. A joystick allowing six degrees of freedom of hand input force for conversion of the hand input force into electrical output signals, said joystick comprising a) a handle;

b) a base;

c) at least three dual-axis force sensors attached to said base; and d) means for rigidly coupling said sensors to said handle so as to support the handle and to transmit said hand input force to the sensors, whereby the hand input force varies the force quantities measured by the sensors in relation to the direction and magnitude of the hand input force.

* * * * *